Patented Oct. 6, 1953

2,654,789

UNITED STATES PATENT OFFICE 2,654,789

NEW CHLOROFLUORO DERIVATIVES OF CYCLOHEXANE AND METHOD OF MAKING SAME

Waldo B. Ligett, Berkley, Mich., assignor to Ethyl Corporation, New York, N. Y., a corporation of Delaware No Drawing. Application March 12, 1948,
Serial No. 14,646

3 Claims. (Cl. 260—648)

This invention relates to new compositions of matter comprising certain chlorofluoro derivatives of cyclohexane. It also relates to methods of manufacture of such products. More particularly, it relates to a method of manufacture of new derivatives of cyclohexane having the general formula $(CF_3)_mC_6Cl_nF_{12-n-m}$, wherein $m$ is a number from 1 to 4, inclusive, and $n$ is a number from 1 to $6-m$, inclusive. These compounds are referred to herein as chlorofluorocarbons.

The chlorofluorocarbons of my invention are particularly useful as hydraulic fluids because they are noninflammable, not corrosive to metals, do not attack gasket materials, and remain liquid over a wide temperature range. Their properties make them particularly useful as components of aircraft hydraulic fluids, but their utility is not limited to such use.

The chlorofluorocarbons are useful as power transmission fluids, as in the "fluid coupling," not only because of noninflammability and chemical inertness, but also because of high density. The efficiency of power transmission by fluid couplings is greatly improved by the employment of high-density fluids, permitting reduction in the size of the power-transmission unit and other economies.

The chemical nonreactivity and noninflammability of the chlorofluorocarbons makes them useful as solvents in special applications, particularly where a selective solvent action is desired.

In order further to illustrate the desirable properties which make the chlorofluorocarbons of my invention attractive for uses as outlined above, the physical properties of a few of the compounds which are made by my invention are given in Table I. It should be noted that the properties given for the compounds in Table I are those for a mixture of isomers which correspond to the given semi-structural formula. As is herein discussed, the proportion of isomers will vary depending on conditions of operation, the choice of fluorinating agent, and the starting material. However, with the exception of freezing point, the physical properties listed in Table I vary only slightly for different isomers.

TABLE I

*Properties of chlorofluorocarbons*

| Compound | Boiling Point in Degrees Centigrade at 760 mm. Mercury | Freezing Point in Degrees Centigrade | Refractive Index, 20° C. | Specific Gravity, 20/20 |
|---|---|---|---|---|
| $CF_3C_6ClF_{10}$ | 103 | −59 | 1.311 | 1.830 |
| $CF_3C_6Cl_2F_9$ | 134 | −36 | 1.342 | 1.865 |
| $CF_3C_6Cl_3F_8$ | 162 | −18 | 1.370 | 1.894 |
| $CF_3C_6Cl_4F_7$ | 190 | +12 | 1.393 | 1.923 |
| $CF_3C_6Cl_5F_6$ | 217 | above +20 | | |
| $(CF_3)_2C_6ClF_9$ | 128 | −95 | 1.318 | 1.887 |
| $(CF_3)_2C_6Cl_2F_8$ | 154 | −85 [1] | 1.345 | 1.915 |

[1] Does not crystallize. Forms a glassy solid.

The preparation of the chlorofluorocarbons of my invention is accomplished by the reaction of chlorinated derivatives of benzotrifluoride and hexafluoroxylene with a fluorinating agent comprising a metallic perfluoride or with a plurality of metallic perfluorides employed in sequence. A two-step procedure is preferable wherein the chlorofluorocarbon is made in the first step and the fluorinating agent is regenerated by the action of fluorine in the second step.

The fluorinating agent used in my invention is a metallic perfluoride having the general formula $MF_a$, where $M$ is a metal and $a$ indicates the number of fluorine atoms. The preferred metallic perfluorides are silver difluoride, $AgF_2$; cobalt trifluoride, $CoF_3$; and lead tetrafluoride, $PbF_4$. However, cerium tetrafluoride, $CeF_4$, and manganic trifluoride, $MnF_3$, can also be used in my process. These perfluorides have characteristic properties which make them desirable for use as fluorinating agents in my process. The characteristic properties of a fluorinating agent suitable for conducting the process of my invention are that it be capable of replacing hydrogen atoms in a compound with fluorine, and of adding fluorine to aromatic nuclei to produce saturated compounds, without excessive cleavage of carbon-carbon bonds.

The organic materials which I fluorinate with the above fluorinating agents are derivatives of benzene having the general formula:

$$(CF_3)_yC_6H_zCl_x$$

wherein $y$ is a number from 1 to 4, inclusive; $x$ is a number from 1 to $6-y$, inclusive and $z$ is the number $6-x-y$.

Therefore, a broad aspect of my invention is in the process of fluorinating nuclear-chlorinated trifluoromethylated benzenes of the above general formula with a metallic perfluoride having certain characteristics, as set forth herein, to produce new compositions of matter which comprise chlorofluorocyclohexanes having the general formula $$(CF_3)_mC_6Cl_nF_{12-n-m}$$

as defined previously herein.

It should be noted that the letters which indicate the number of certain atoms or groups in the formulae for the starting materials and the new products are different, although they may have the same numerical value. The reason for this is that each of the starting materials may yield more than one of the desired products, particularly when $x$ is greater than one, as is more fully discussed hereinafter.

Although, with few exceptions, I find it most desirable to employ as starting materials compounds in which the nuclear halogen atoms are chlorine atoms, I have found that my process is equally applicable to the production of chlorofluorocarbons if the nuclear halogen atoms include, in addition to chlorine, one or more atoms selected from among fluorine, bromine, and iodine. Therefore, a broader aspect of my invention is in the process of fluorinating a nuclear-halogenated trifluoromethylated benzene having the general formula $$(CF_3)_yC_6H_zCl_xA_k$$

wherein A is a halogen other than chlorine, $y$ is a number from 1 to 4, inclusive; $x$ is not less than one, $x+k$ totals from 2 to $6-y$, inclusive, and $z$ is $6-x-y-k$, with a metallic perfluoride having certain characteristics as set forth herein, to produce new compositions of matter which comprise chlorofluoro cyclohexanes having the general formula $(CF_3)_mC_6Cl_nF_{12-n-m}$, as defined previously herein.

The chlorofluoro compounds used as starting materials in my process are termed "nuclear-chlorinated derivatives of trifluoromethyl benzenes." Their preparation involves one or more reactions which are reported in the patent and journal literature. These reactions are:

(1) Chlorination of the aromatic nucleus, thermally or catalytically.

(2) Chlorination of the side-chains on the aromatic nucleus to give one or more trichloromethyl groups, usually in the presence of light.

(3) Fluorination of the trichloromethyl groups, preferably with anhydrous hydrogen fluoride.

The reactions are not necessarily employed in the sequence given, but in some instances are performed in the order 2, 1, 3 or 2, 3, 1, depending upon the compound to be prepared.

The chlorobenzotrifluorides are prepared by the steps given above in the order 1, 2, 3 or 2, 1, 3 or 2, 3, 1. I prefer to prepare my chlorobenzotrifluorides by nuclear chlorination of benzotrifluoride, as described in Holt and Daudt United States Patents Nos. 2,174,512 and 2,174,513, both of October 3, 1939, which involve the sequence 2, 3, 1. However, some of the chloro-bis(trifluoromethyl)benzenes are better prepared by one of the other alternate routes, with fluorination of the trichloromethyl groups as described in British Patent No. 395,227, of July 13, 1933, to I. G. Farbenindustrie Aktiengesellschaft.

In some instances, it is desirable or necessary to repeat steps 2 and 3. This is particularly true in the preparation of compounds in which the methyl groups are adjacent, as, for example, in ortho xylene, or in 1,2,4,5-tetramethylbenzene, because of the difficulty of introducing more than five chlorine atoms into a pair of adjacent methyl groups.

The choice among the alternate routes to the desired starting material depends upon the isomer to be employed, the number of side chains, and the number of nuclear halogen atoms. Although no simple, general rule can be set up, those skilled in the art will be able to prepare the desired starting materials by employing the well-known reactions cited above in the proper sequence.

The procedure for making the starting materials used in my process can be further illustrated by referring to the following typical examples, Nos. 1 to 5, inclusive, which give in detail the several methods which can be used as outlined generally above.

EXAMPLE 1.—PREPARATION OF CHLORINATED BIS(TRIFLUOROMETHYL)BENZENES.—PROCEDURE A

*Preparation of p - bis(trichloromethyl)benzene.*—p-Xylene (22 moles) was photochemically chlorinated in a Pyrex test tube 45 inches in length and 3¾ inches I. D. The tube was illuminated with three 30-watt 360 BL lamps. The chlorine was introduced through a fritted glass disc near the bottom of the tube. Approximately 4000 grams of chlorine was introduced at 80 to 100 degrees centigrade. Another 4000 grams of chlorine was introduced at temperatures gradually increasing from 100 to 140 degrees centigrade. The remaining 1000 grams of chlorine, to give a total weight increase of product approximately 4500 grams, was introduced at from 140 to 150 degrees centigrade. After being blown with air, 12,400 grams of product having a melting point of from 103 to 107 degrees centigrade was obtained. Crystallization of the chlorination product gave an 87.5% yield of purified p-bis(trichloromethyl)benzene, melting point 109 to 110 degrees centigrade.

*Preparation of p - bis(trifluoromethyl)benzene.*—Three moles (939 grams) of crystallized p-bis(trichloromethyl)benzene and 9.5 grams of antimony pentachloride were charged to a two-liter steel autoclave equipped with a stirrer, reflux condenser with a bleed-off valve at its upper end, pressure-release disc, and hydrogen fluoride inlet. Hydrogen fluoride (447 grams) was then charged and the autoclave was heated. When the temperature reached 63 degrees centigrade, the pressure in the autoclave was 500 pounds per square inch gauge. The bleed-off valve above the reflux condenser was opened slightly to maintain the pressure at approximately 500 pounds per square inch gauge as the temperature was increased to 100 degrees centigrade. After the temperature had been maintained at approximately 100 degrees centigrade for one hour with the vent line closed and no appreciable change in pressure had occurred, the reaction was assumed to be complete. The pressure was vented to atmospheric, and the product from the autoclave was poured into a copper beaker. Water was added to dissolve the hydrogen fluoride and the aqueous layer was made alkaline with soda ash. The product was steam-distilled from the alkaline solution, dried, and rectified at atmospheric pressure. A 90% yield (579 grams) of p-bis(trifluoromethyl)benzene, boiling point 114 to 114.8 degrees centigrade, was obtained.

*Chlorination of p-bis(trifluoromethyl)benzene.*—p-Bis(trifluoromethyl)benzene was vaporized from a flask and the vapors together with elemental chlorine were passed through a vertical tube packed with glass Raschig rings and activated bone charcoal impregnated with antimony pentachloride. The vapors that passed upward through the column were condensed and allowed to run back into the vaporizing flask. The packed column was maintained at 260 to 280 degrees centigrade during the chlorination. The temperature of the p-bis(trifluoromethyl)-benzene in the vaporization flask was 118 degrees centigrade, when the experiment was started. When the temperature of the liquid in the vaporizer reached 145 degrees centigrade, indicating that considerable halogenation had occurred, the experiment was discontinued. After being washed and dried, the product was rectified at atmospheric pressure. In addition to unreacted p-bis(trifluoromethyl)benzene, there was obtained: 79 grams (16%) of monochlorobis(trifluoromethyl)benzene, boiling point 146 to 148 degrees centigrade; 65 grams (11.5%) of dichlorobis(trifluoromethyl)benzene, boiling point 172.5 to 175 degrees centigrade; 20 grams (3.1%) of trichlorobis(trifluoromethyl)benzene, boiling point 202 to 204 degrees centigrade; and a small quantity of higher boiling unidentified product.

EXAMPLE 2.—PREPARATION OF CHLORINATED BIS-(TRIFLUOROMETHYL)BENZENE.—PROCEDURE B

*Preparation of chloroxylenes.*—Eight moles (854 grams) of m-xylene was chlorinated in an iron tube at 18 to 25 degrees centigrade until the weight of the material had increased 315 grams. The product was blown with air, washed, and dried. Rectification of the product at atmospheric pressure yielded 812 grams (72.3%) of monochloroxylene, boiling point 180 to 185 degrees centigrade, and higher boiling products.

*Preparation of chloro-bis(trifluoromethyl)-benzene.*—Monochloroxylene was photochemically chlorinated to chloro-bis(trichloromethyl)-benzene as described in Procedure A for the chlorination of p-xylene to p-bis(trichloromethyl)benzene. The resulting chloro-bis(trichloromethyl)benzene was then fluorinated to chloro-bis(trifluoromethyl)benzene with hydrogen fluoride in presence of antimony pentachloride as described in Procedure A for the preparation of p-bis(trifluoromethyl)benzene from p-bis(trichloromethyl)benzene.

EXAMPLE 3.—PREPARATION OF CHLORINATED BIS-(TRIFLUOROMETHYL)BENZENE.—PROCEDURE C

The third procedure used for the preparation of chlorinated bis(trifluoromethyl)benzenes involved only steps previously described under Procedures A and B, but performed in a different sequence. Hexachloroxylene was prepared as described in Procedure A by the photochemical chlorination of xylene. The bis(trichloromethyl)benzene was chlorinated in an iron tube and the chlorinated derivatives of hexachloroxylene were fluorinated with hydrogen fluoride in an autoclave in the presence of antimony pentachloride.

EXAMPLE 4.—PREPARATION OF CHLORINATED BENZOTRIFLUORIDES o- and p-Chlorotoluenes were prepared by the nuclear chlorination of toluene catalyzed by ferric chloride. The isomers were separated by rectification, and the separate isomers were photochemically chlorinated to the corresponding o- and p-chlorobenzotrichlorides. Reaction of these products with hydrogen fluoride in an autoclave in the presence of antimony pentachloride gave the desired o- and p-chlorobenzotrifluorides, boiling point 152 degrees centigrade and 137 degrees centigrade, respectively.

EXAMPLE 5.—PREPARATION OF CHLORINATED BENZOTRIFLUORIDES

The ferric chloride catalyzed chlorination of benzotrifluoride at temperatures ranging from 50 to 150 degrees centigrade gave: monochlorobenzotrifluoride, boiling point 132 to 136 degrees centigrade; dichlorobenzotrifluoride, boiling point 172 to 174 degrees centigrade; trichlorobenzotrifluoride, boiling point 200 to 203 degrees centigrade; tetrachlorobenzotrifluoride, boiling point 232 to 239 degrees centigrade; and pentachlorobenzotrifluoride, melting point 78 to 82 degrees centigrade. The extent of chlorination was dependent on the quantity of chlorine used, and the temperature of reaction. Temperatures above 100 degrees centigrade were found necessary for rapid chlorination to the more highly chlorinated benzotrifluoride derivatives.

The selection of the starting material depends on the new product or products desired. For example, if final products containing one trifluoromethyl group are desired, it is preferred to select a starting material wherein $y$ is equal to 1. The new products that are produced when $y$ is equal to 1 are summarized in Table II, which gives names and semi-structural formulae of the starting materials and of the new products. Fluorinating agents of the type described herein were used. The conditions of operations varied as illustrated in specific Examples 6 to 22, inclusive.

TABLE II

*Products derived from chlorinated benzotrifluorides*

[$y=1$.]

| No. | Starting Material | Product |
|---|---|---|
| 1 | monochlorobenzotrifluoride $CF_3C_6H_4Cl$ | monochlorotridecafluoromethylcyclohexane $CF_3C_6ClF_{10}$ |
| 2 | dichlorobenzotrifluoride $CF_3C_6H_3Cl_2$ | dichlorododecafluoromethylcyclohexane $CF_3C_6Cl_2F_9$ |
| 3 | trichlorobenzotrifluoride $CF_3C_6H_2Cl_3$ | trichloroundecafluoromethylcyclohexane $CF_3C_6Cl_3F_8$ |
| 4 | tetrachlorobenzotrifluoride $CF_3C_6HCl_4$ | tetrachlorodecafluoromethylcyclohexane $CF_3C_6Cl_4F_7$ |
| 5 | pentafluorobenzotrifluoride $CF_3C_6Cl_5$ | pentachlorononafluoromethylcyclohexane $CF_3C_6Cl_5F_6$ |

It is to be understood that a mixture of products is usually formed. In some cases it is desirable to start with compounds having more chlorine atoms than are desired in one of the final products. For example, if the compound $CF_3C_6ClF_{10}$ is to be prepared, it is advantageous to start with the compound $CF_3C_6H_3Cl_2$, in which case a mixture of the compounds $CF_3C_6ClF_{10}$ and $CF_3C_6Cl_2F_9$ are formed. The mixture of products can be separated in a subsequent step of the process.

The following typical equation (unbalanced) will further illustrate this point:

$$CF_3C_6H_3Cl_2 + MF_a \rightarrow C_7Cl_2F_{12} + C_7ClF_{13} + C_7F_{14} + HF + Cl_2 + MF_b$$

where $MF_a$ represents a metallic perfluoride capable of adding fluorine to aromatic nuclei, and of replacing with fluorine both hydrogen and chlorine atoms, and $MF_b$ represents a lower state of oxidation. Thus it is seen that side reactions also occur. Saturated fluorocarbons as well as chlorofluorocarbons generally result from this reaction. Likewise if the starting compound $CF_3C_6Cl_5$ is used, a mixture of all five of the products listed in Table II can be obtained, depending on conditions and the fluorinating agent. This is further illustrated by the specific examples given subsequently herein. It is to be understood that the various isomers of the five products listed in Table II are formed. These isomers have not been separated and identified in all cases, but the product has been identified as to the general formula given.

Likewise, the starting materials were not single isomers, but were a mixture (in most cases) of isomers having the general formula as given in Table II. For example, the following isomers or mixtures thereof can be used, the $CF_3$ group being here considered as attached at the 1-position of the benzene ring:

(1) Monochlorobenzotrifluoride, $CF_3C_6H_4Cl$
   Isomers (3): 2-; 3-; and 4-chloro.
(2) Dichlorobenzotrifluoride, $CF_3C_6H_3Cl_2$
   Isomers (6): 2,3-; 2,4-; 2,5-; 2,6-; 3,4-; and 3,5-dichloro.
(3) Trichlorobenzotrifluoride, $CF_3C_6H_2Cl_3$
   Isomers (6): 2,3,4-; 2,3,5-; 2,3,6-; 2,4,5-; 2,4,6-; and 3,4,5-trichloro.
(4) Tetrachlorobenzotrifluoride, $CF_3C_6HCl_4$
   Isomers (3): 2,3,4,5-; 2,3,4,6-; and 2,3,5,6-.
(5) Pentachlorobenzotrifluoride, $CF_3C_6Cl_5$
   Isomers: Only one compound, 2,3,4,5,6-pentachlorobenzotrifluoride, possible.

In a similar manner the starting materials used to make the corresponding products, when $y=2$, $y=3$, and $y=4$, are given in Tables III, IV, and V, respectively.

TABLE III

Products derived from chlorinated bis-(trifluoromethyl) benzenes

[$y=2$.]

| No. | Starting Material | Product |
|---|---|---|
| 1 | monochloro-bis(trifluoromethyl)benzene $(CF_3)_2C_6H_3Cl$ | monochloropentadecafluorodimethylcyclohexane $(CF_3)_2C_6ClF_9$ |
| 2 | dichloro-bis(trifluoromethyl)benzene $(CF_3)_2C_6H_2Cl_2$ | dichlorotetradecafluorodimethylcyclohexane $(CF_3)_2C_6Cl_2F_8$ |
| 3 | trichloro-bis(trifluoromethyl)benzene $(CF_3)_2C_6HCl_3$ | trichlorotridecafluorodimethylcyclohexane $(CF_3)_2C_6Cl_3F_7$ |
| 4 | tetrachloro-bis(trifluoromethyl)benzene $(CF_3)_2C_6Cl_4$ | tetrachlorododecafluorodimethylcyclohexane $(CF_3)_2C_6Cl_4F_6$ |

TABLE IV

Products derived from chlorinated tris-(trifluoromethyl) benzenes

[$y=3$.]

| No. | Starting Material | Product |
|---|---|---|
| 1 | monochloro-tris(trifluoromethyl)benzene $(CF_3)_3C_6H_2Cl$ | monochloroheptadecafluorotrimethylcyclohexane $(CF_3)_3C_6ClF_8$ |
| 2 | dichloro-tris(trifluoromethyl)benzene $(CF_3)_3C_6HCl_2$ | dichlorohexadecafluorotrimethylcyclohexane $(CF_3)_3C_6Cl_2F_7$ |
| 3 | trichloro-tris(trifluoromethyl)benzene $(CF_3)_3C_6Cl_3$ | trichloropentadecafluorotrimethylcyclohexane $(CF_3)_3C_6Cl_3F_6$ |

TABLE V

Products derived from chlorinated tetrakis-(trifluoromethyl) benzenes

[$y=4$.]

| No. | Starting Material | Product |
|---|---|---|
| 1 | monochloro-tetrakis(trifluoromethyl)benzene $(CF_3)_4C_6HCl$ | monochlorononadecafluorotetramethylcyclohexane $(CF_3)_4ClF_7$ |
| 2 | dichloro-tetrakis(trifluoromethyl)benzene $(CF_3)_4C_6Cl_2$ | dichlorooctadecafluorotetramethylcyclohexane $(CF_3)_4Cl_2F_6$ |

My process is primarily directed to obtaining the highest possible yields of chlorofluorocarbon products by minimizing substitution of chlorine with fluorine in the starting material. By proper choice of fluorinating agent or agents, organic reactants, and conditions, the preferential replacement of hydrogen over chlorine is accomplished, within certain limits. Yields as high as 90 per cent of the chlorofluorocarbons have been obtained. The total yield of halocarbons (fluorocarbons and chlorofluorocarbons) possessing the original carbon structure has been as high as 92 per cent, and in small-scale operations, the yield averages 85 per cent.

In general, the operating temperature is the lowest temperature or temperature gradient which will give conversion to chlorofluorocarbons at a satisfactory rate. The addition of fluorine to the aromatic nucleus takes place at comparatively low temperatures, as does substitution of some of the hydrogen with fluorine. However, the molecule becomes increasingly resistant to fluorination, and high temperatures are required in the later stages of the reaction to replace the last hydrogen atoms. Thus, because of the desirability of employing gradually increasing temperatures, the differences in reactivity of the several fluorinating agents, the differences in the starting materials, and the effect of other variables such as pressure and contact time, my process for vapor-phase operation requires temperature gradients within the range of from 100 to 600 degrees centigrade. For liquid-phase operations, I prefer to use lower temperature gradients of the order of 0° C. to 400° C. A suitable temperature gradient is achieved in batch processes by gradually increasing the temperature from a relatively low temperature, for example 100° C. to 200° C., to final temperatures in the range of 300° C. to 500° C. for reasons given above.

The same temperature gradient effect is obtained in a continuous process by increasing the temperature from the inlet to the outlet of the reaction zone.

The conditions of the reaction will vary considerably with the fluorinating agent employed, and to some extent with the material to be fluorinated. For example, when AgF₂ or CoF₃ is used, the minimum final temperature satisfactory for conversion of the starting materials to chlorofluorocarbons is 300° C., with a preferred final temperature of between 325° C. and 375° C. For PbF₄, the minimum final temperature is 400° C. and the preferred temperature is about 450° C. For CeF₄ and MnF₃, the minimum final temperature is between 425° C. and 450° C., with the preferred temperature being somewhat higher. The temperature for any given reaction is of course closely related to contact time. For best results, temperature must be properly correlated with the contact time. Considerable fluorination occurs with AgF₂, CoF₃, PbF₄, MnF₃ and CeF₄ below those temperatures given as final preferred temperatures, and in practice it is preferred to use gradually increasing temperatures through the reaction zone, as the reaction proceeds. Temperatures higher than those given above result in more replacement of chlorine, and more carbon-carbon fission, which are undesirable. The selection of the proper temperature and other conditions will become more apparent by referring to the specific conditions of operation and the examples.

While the manufacture of the new products of my invention from the starting material is a one-step process, a two-step process is preferred for economical operation in order to regenerate the fluorinating agent. In the second step, the reduced metal fluoride is regenerated to the active perfluoride by the action of fluorine.

In my preferred two-step process, the partially halogenated aromatic starting material is treated in the vapor phase with a metallic perfluoride, the latter giving up a portion of its fluorine in the process, and subsequently being regenerated with elemental fluorine.

The two-step process is illustrated by the following typical equations:

(1)

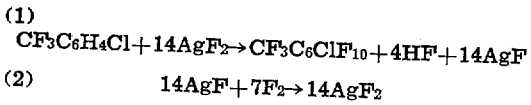

(2) $14AgF + 7F_2 \rightarrow 14AgF_2$

Thus the metal fluoride is not consumed in the process, except for minor mechanical losses, and may be used indefinitely. The metallic fluoride is regenerated by contact with elemental fluorine, usually at temperatures from 200° C. to 400° C.

A broad embodiment of my invention comprises vaporization of the organic reactant or starting material; passage of the vapors over one or more solid fluorinating agents under suitable conditions of temperature, pressure, and contact time; and recovery of the products by condensation followed by suitable separation and purification methods.

Vaporization of the starting material is accomplished in a vaporization chamber, or by introducing it to the fore-part of a hot reaction zone. Vaporization is assisted by employment of an inert gas, such as nitrogen or helium. I have found it advantageous to dissolve solid starting materials in an inert diluent, such as one of the chlorofluorocarbons.

In passage of the organic reactant over and through the metallic perfluoride, for reasons given previously, gradually increasing temperatures through the reaction zone are employed. With silver difluoride, a temperature gradient of 125° C. to 375° C. is suitable. Cobalt trifluoride functions satisfactorily under similar temperature conditions. Less reactive fluorinating agents require higher temperatures.

I have also found it desirable to carry out the fluorination step in two cycles, separating the organic product from hydrogen fluoride, chlorine, or other impurities between cycles. The increased contact between organic reactant and metallic fluoride thus obtained results in an improved product. When a two-cycle procedure is employed, the metallic fluoride is preferably regenerated between cycles, and the second cycle is preferably at a higher temperature than the first cycle. Thus, in fluorination with cobalt trifluoride, the organic reactant is passed over and through the metallic perfluoride at 175° C., the resulting organic product separated, and then recycled over regenerated cobalt trifluoride at 350° C.

I have found it advantageous in some instances to employ two or more reagents in series. For example, a first cycle in which lead tetrafluoride is employed as fluorinating agent, followed by a second cycle using silver difluoride, results in better yields of chlorofluorocarbon products than does use of silver difluoride in both cycles.

Use of chlorine admixed with vapors of the organic reactant is another improvement I have discovered for the preparation of chlorofluorocarbons. By this technique, I have been able to obtain high yields of chlorine-containing halocarbons. Further, when chlorine is passed into the reaction zone together with the organic reactant, it is not necessary that the original starting material contain chlorine. Thus, it is possible to obtain chlorofluorocarbons without the necessity of preparing the chlorinated intermediate in a separate step. I have found, for example, that if chlorine is passed with hexafluoroxylene over silver difluoride under the proper conditions, there is obtained substantial quantities of $(CF_3)_2C_6ClF_9$ and $(CF_3)_2C_6Cl_2F_3$.

The above description is for vapor-phase reactions, but it is understood that liquid-phase or mixed-phase reactions can be successfully employed in carrying out my invention. In liquid-phase operations, it is advantageous, although not necessary, to employ a solvent for the organic reactant. The solvent improves the control of the temperature, and facilitates separation of the product from the solid fluorinating agent. The solvent, desirably, is substantially inert to the fluorinating agent employed. Saturated fluorocarbons and certain chlorofluorocarbons are satisfactory for this purpose. In general, liquid-phase reactions are conducted at lower temperatures than mixed- or vapor-phase processes.

Having the above general procedure in mind, my invention will be further understood by reference to the following illustrative examples:

EXAMPLE 6.—FLUORINATION OF m-CHLOROBENZOTRIFLUORIDE WITH AgF₂

Seven moles (1003 grams) of anhydrous silver chloride was evenly distributed on the lower surface of a reaction chamber, in a layer approximately ½ inch deep. A total of 21 moles of silver chloride was thus introduced into a reactor unit consisting of three reaction chambers mounted one above another and connected in series by means of copper tubing.

Fluorine was passed into the reactor at 100° C. until fluorine could be detected at the outlet. The temperature was then raised to 250° C. and the passage of fluorine through the reactor was continued until fluorine was again detected in the exit line. The first product of this reaction is silver monofluoride which, upon further fluorination, is converted to the difluoride.

A stream of nitrogen was passed through the reactor to sweep it free of elemental fluorine. m-Chlorobenzotrifluoride (270.5 grams) was then added to the top reactor chamber from a dropping funnel at a uniform rate over a period of approximately six and one-half (6½) hours. Each reactor chamber was alternately heated or cooled in order to maintain the temperature within the chambers at approximately 175° C.

The product emitted from the bottom chamber passed into a copper receiver containing 50 to 100 milliliters of water. This receiver, which was immersed in an ice bath, served to condense the less volatile products and as an absorber for most of the hydrogen fluoride liberated in the reaction. A second copper receiver, connected in series with the first, was cooled by a Dry-Ice bath. The second receiver condensed the more volatile organic products, the chlorine, and the hydrogen fluoride not trapped in the first receiver.

After all the m-chlorobenzotrifluoride had been introduced to the reactor, the reactor was flushed with a slow stream of nitrogen. The volume of nitrogen used was from three to five times the volume of the reactor. The product from the two receivers was given a preliminary washing with 10 per cent potash solution and stored until after the reactor was regenerated.

The receivers were reconnected and the reactor was regenerated with elemental fluorine at 250 to 375 degrees centigrade. The system was again flushed with nitrogen and the small quantity of product condensed in the receivers during regeneration was combined with the main fraction and the combined product was washed further with potash solution and water, and dried.

The 406 grams of incompletely halogenated product was then recycled over silver difluoride at 375° C. in approximately six hours in the manner described for the first cycle. The product was washed, dried, and rectified. From the 465 grams of product, there were obtained on rectification at atmospheric pressure 8.1 grams (1.8%) of $C_6F_{12}$, boiling point 48 to 52° C.; 289.3 grams (55%) of $C_7F_{14}$, boiling point 74° C. to 76° C.; 139.9 grams (25.4%) of $C_7ClF_{13}$, boiling point 101° C. to 103° C.; and 11.2 grams (2.0%) of $C_7Cl_2F_{12}$, boiling point 129° C. to 131° C.

EXAMPLE 7.—FLUORINATION OF p-CHLOROBENZOTRIFLUORIDE WITH $AgF_2$ p-Chlorobenzotrifluoride (270.5 grams) was fluorinated with silver difluoride using the procedure described in Example 6. The p-chlorobenzotrifluoride was fed over a period of 11 hours to the reactor maintained at approximately 175° C. The product from the first cycle was recycled over the regenerated silver difluoride at 375° C. during a period of six hours. The following products were obtained on rectification at atmospheric pressure: 8.5 grams (1.9%) of $C_6F_{12}$, boiling point 49° C. to 51° C.; 279.1 grams (53.2%) of $C_7F_{14}$, boiling point 75° C. to 76° C.; 149.1 grams (27.1%) of $C_7ClF_{13}$, boiling point 102 to 103° C.; and 16.5 grams (2.9%) of $C_7Cl_2F_{12}$, boiling point 130° C. to 132° C.

EXAMPLE 8.—FLUORINATION OF o-CHLOROBENZOTRIFLUORIDE WITH $AgF_2$

The procedure described in Example 6 was used for the fluorination of o-chlorobenzotrifluoride with silver difluoride. The same conditions were used except that the time of addition of the material being fluorinated was five and one-half (5½) hours during the first cycle, and four hours during the second cycle.

On rectification at atmospheric pressure the following fractions were obtained: 1.7 grams (0.4%) of $C_6F_{12}$, boiling point 49° C. to 51° C.; 316.8 grams (60.4%) of $C_7F_{14}$, boiling point 75° C. to 76.5° C.; 151.6 grams (27.6%) of $C_7ClF_{13}$, boiling point 102° C. to 103° C.; and 19.5 grams (3.4%) of $C_7Cl_2F_{12}$, boiling point 130° C. to 132° C.

EXAMPLE 9.—FLUORINATION OF m-CHLOROBENZOTRIFLUORIDE WITH $PbF_4$ FOLLOWED BY FLUORINATION WITH $AgF_2$

A total of 10.5 moles of lead chloride was equally distributed among the three reaction chambers constituting a reactor. Hydrogen fluoride was passed into the reactor at 100° C. until the initial reaction with lead chloride had subsided. The temperature of the reactor was then gradually raised to 350° C. and hydrogen fluoride addition was continued until hydrogen fluoride was detected in the exit lines. No attempt was made to determine the extent of conversion of lead dichloride to lead difluoride. Conversion to lead tetrafluoride was accomplished by passing elemental fluorine into the reactor at 250° C. to 375° C. until an excess of fluorine was detected at the outlet.

After the reactor was flushed with nitrogen, 270.5 grams of m-chlorobenzotrifluoride was added at a uniform rate to the top reaction chamber from a dropping funnel over a six-hour period in the manner described in Example 6. The first, second, and third reaction chambers were maintained at approximately 225° C., 225° C., and 275° C., respectively.

After the lead difluoride had been reconverted to lead tetrafluoride with elemental fluorine, the product from the first cycle (348 grams) was washed, dried, and repassed through the reactor. The first, second, and third reaction chambers were maintained at approximately 275, 325, and 375° C., respectively, during the four-hour cycle time.

The washed and dried product from the second cycle (443 grams) was then passed through the reactors containing silver difluoride to perhalogenate the material. The reactor was maintained at 375° C. during the four-hour cycle period.

Rectification of the product at atmospheric pressure yielded the following fractions: 17 grams (3.8%) of $C_6F_{12}$, boiling point 49° C. to 52° C.; 217 grams (41.3%) of $C_7F_{14}$, boiling point 75° C. to 76° C.; 177 grams (32.1%) of $C_7ClF_{13}$, boiling point 102° C. to 103° C.; 34 grams (6.0%) of $C_7Cl_2F_{12}$, boiling point 129° C. to 131° C.

EXAMPLE 10.—FLUORINATION OF m-CHLOROBENZOTRIFLUORIDE WITH $CoF_3$

Seven moles of anhydrous cobaltous chloride was charged to each of the three reaction chambers of a reactor unit. Hydrogen fluoride was passed into the reactor at temperatures that were gradually increased from 100° C. to 350° C. After the rate of reaction of hydrogen fluoride with cobaltous chloride had subsided, elemental fluorine was passed into the reactor maintained at 250° C. to 375° C. until an excess of fluorine was detected at the outlet when the reactors were at 375° C.

The procedure described in Example 6 was used for the fluorination of 270.5 grams of m- chlorobenzotrifluoride with cobalt trifluoride. The first cycle was made over a period of 12 hours at 175° C., and the second cycle over a period of six hours at 375° C.

Rectification of the washed and dried product yielded: 181 grams (34.4%) of $C_7F_{14}$, boiling point 75° C. to 76° C.; 218 grams (39.8%) of $C_7ClF_{13}$, boiling point 102° C. to 103° C.; 84 grams (14.7%) of $C_7Cl_2F_{12}$, boiling point 158° C. to 160° C.

EXAMPLE 11.—FLUORINATION OF p-CHLOROBENZOTRIFLUORIDE WITH $AgF_2$ USING NITROGEN AS AN INERT DILUENT

One and one-half moles (270.5 grams) of p-chlorobenzotrifluoride was added over an eleven-hour period to a reactor containing silver difluoride maintained at 125° C. in the manner described in Example 6, except that a slow stream of nitrogen was also passed simultaneously through the reactor. The washed and dried product from the first cycle was recycled over silver difluoride without nitrogen at 375° C. Rectification of the product yielded: 14 grams (3.0%) of $C_6F_{12}$, boiling point 49° C. to 51° C.; 301 grams (57.3%) of $C_7F_{14}$, boiling point 74° C. to 76° C.; 126 grams (22.9%) of $C_7ClF_{13}$, boiling point 102° C. to 104° C.; and 15 grams (2.6%) of $C_7Cl_2F_{12}$, boiling point 130° C. to 132° C.

EXAMPLE 12.—FLUORINATION OF DICHLOROBENZOTRIFLUORIDE WITH $CoF_3$

One and one-half moles (322.5 grams) of dichlorobenzotrifluoride was cycled over cobalt trifluoride at 275° C. during a six-hour period. An equal period of time was used for recycling the product obtained (516 grams) over cobalt trifluoride at 375° C. Rectification of the perhalogenated product at atmospheric pressure yielded: 115 grams (20.8%) of $C_7F_{14}$, boiling point 75° C. to 76° C.; 195 grams (35.5%) of $C_7ClF_{13}$, boiling point 102° C. to 103° C.; 150 grams (26.0%) of $C_7Cl_2F_{12}$, boiling point 131° C. to 132° C.; and 34.5 grams (5.8%) of $C_7Cl_3F_{11}$, boiling point 158° C. to 160° C.

EXAMPLE 13.—FLUORINATION OF TRICHLOROBENZOTRIFLUORIDE WITH $AgF_2$

Trichlorobenzothrifluoride (374.5 grams) was passed over silver difluoride at 325° C. and the product from the first cycle was repassed over the same reagent at 375° C. A six-hour period was used for the addition of the material during each cycle. Rectification at asmospheric pressure of the washed and dried product from the second cycle gave: 6.5 grams (1.4%) of $C_6F_{12}$, boiling point 48° C. to 51° C.; 89 grams (16.9%) of $C_7F_{14}$, boiling point 74° C. to 76° C.; 228 grams (41.5%) of $C_7ClF_{13}$, boiling point 101° C. to 103° C.; 113 grams (19.7%) of $C_7Cl_2F_{12}$, boiling point 132° C. to 133° C.; and 28 grams (4.6%) of $C_7Cl_3F_{11}$, boiling point 161° C. to 163° C.

EXAMPLE 14.—FLUORINATION OF TRICHLOROBENZOTRIFLUORIDE WITH $PbF_4$ AND $CoF_3$

One and one-half moles (374.5 grams) of trichlorobenzotrifluoride was cycled and then recycled over lead tetrafluoride. The temperature and time of each of the two cycles was approximately 325° C. and six hours, respectively. The washed and dried product from the second cycle was repassed over cobalt trifluoride at 375° C. in six hours to complete the perhalogenation. The following fractions were obtained on rectification at atmospheric pressure: 56 grams (10.6%) of $C_7F_{14}$, boiling point 74° C. to 76° C.; 230 grams (41.8%) of $C_7ClF_{13}$, boiling point 101.5° C. to 103.5° C.; 163.2 grams (28.4%) of $C_7Cl_2F_{12}$, boiling point 129.5° C. to 132° C., and 31.7 grams (5.3%) of $C_7Cl_3F_{11}$, boiling point 159° C. to 160° C.

EXAMPLE 15.—FLUORINATION OF TETRACHLOROBENZOTRIFLUORIDE WITH $CoF_3$

Tetrachlorobenzotrifluoride (426 grams) was fluorinated by cycling the material over cobalt trifluoride at approximately 325° C. and then recycling over the same reagent at 375° C. During each cycle the material was added at a uniform rate over a six-hour period. Rectification of the product from the second cycle at atmospheric pressure gave: 10 grams (1.9%) of $C_7F_{14}$, boiling point 74° C. to 76° C.; 73 grams (13.2%) of $C_7ClF_{13}$, boiling point 101° C. to 103° C.; 176 grams (30.6%) of $C_7Cl_2F_{12}$, boiling point 129° C. to 131° C.; 176 grams (29.3%) of $C_7Cl_3F_{11}$, boiling point 158° C. to 161° C.; and 69 grams (11.0%) of $C_7Cl_4F_{10}$, boiling point 188° C. to 189° C.

EXAMPLE 16.—FLUORINATION OF PENTACHLOROBENZOTRIFLUORIDE WITH $CoF_3$, EMPLOYING A SOLVENT FOR THE ORGANIC REACTANT

Two moles (637 grams) of pentachlorobenzotrifluoride was dissolved in 766 grams of $C_7Cl_2F_{12}$. The solution was maintained at 50 C. to 60° C. and was added to a reactor containing cobalt trifluoride at 325° C. The washed and dried product from the first six-hour cycle was then repassed over cobalt trifluoride at 375° C. over a period of six hours. The product on rectification at atmospheric pressure yielded: 5.5 grams (0.8%) of $C_7F_{14}$, boiling point 74° C. to 76° C.; 44 grams (6.0%) of $C_7ClF_{13}$, boiling point 102° C. to 104° C.; 862 grams minus 766 grams or 96 grams (12.6%) of $C_7Cl_2F_{12}$, boiling point 131° C. to 133° C.; 261 grams (32.7%) of $C_7Cl_3F_{11}$, boiling point 161° C. to 163° C.; 243 grams (29.2%) of $C_7Cl_4F_{10}$, boiling point 190° C. to 192° C.; and 56 grams (6.5%) of $C_7Cl_5F_9$, boiling point 218° C. to 219° C.

EXAMPLE 17.—FLUORINATION OF DICHLOROBENZOTRIFLUORIDE WITH $CoF_3$ IN THE PRESENCE OF CHLORINE

Chlorine (4.5 moles) was passed into a reactor containing cobalt trifluoride at 275° C. simultaneously with 1.5 moles of dichlorobenzotrifluoride, over a period of six hours. During the six-hour second cycle over cobalt trifluoride at 375° C., 3.0 moles of chlorine was used. Rectification of the product at atmospheric pressure gave: 12 grams (2.3%) of $C_7F_{14}$, boiling point 74° C. to 76° C.; 64 grams (11.6%) of $C_7ClF_{13}$, boiling point 101° C. to 103° C.; 151 grams (26.3%) of $C_7Cl_2F_{12}$, boiling point 130° C. to 132° C.; 192 grams (32.0%) of $C_7Cl_3F_{11}$, boiling point 159.5° C. to 161.5° C.; and 117 grams (18.6%) of $C_7Cl_4F_{10}$, boiling point 188.5° C. to 190° C.

EXAMPLE 18.—FLUORINATION OF TETRACHLOROBENZOTRIFLUORIDE WITH $CoF_3$ IN THE PRESENCE OF CHLORINE

Three moles of chlorine was passed at a uniform rate into a reactor containing cobalt trifluoride simultaneously with 426 grams of tetrachlorobenzotrifluoride over a six-hour period. The same quantity of chlorine was used during the second six-hour cycle over cobalt trifluoride. The reactor was maintained at approximately 325° C. during the first cycle, and at 375° C. during the second cycle. The following fractions were obtained when the washed and dried product was rectified at atmospheric pressure: 4.8 grams (0.9%) of $C_7F_{14}$, boiling point 74° C. to 76° C.; 42 grams (7.7%) of $C_7ClF_{13}$, boiling point 102° C. to 103.5° C.; 138 grams (24.0%) of $C_7Cl_2F_{12}$, boiling point 130° C. to 132° C.; 208 grams (34.6%) of $C_7Cl_3F_{11}$, boiling point 160° C. to 162° C.; and 143 grams (22.8%) of $C_7Cl_4F_{10}$, boiling point 189° C. to 190° C.

EXAMPLE 19.—FLUORINATION OF PENTACHLOROBENZOTRIFLUORIDE WITH $CoF_3$ IN THE PRESENCE OF CHLORINE

Two moles (637 grams) of pentachlorobenzotrifluoride dissolved in 766 grams of $C_7Cl_2F_{12}$ was added simultaneously with one mole of chlorine to a reactor containing cobalt trifluoride at 325° C. over a six-hour period. The product from the first cycle was recycled over cobalt trifluoride at 375° C., with one mole of chlorine, in six hours. Rectification of the product gave: 15 grams (2.0%) of $C_7ClF_{13}$, boiling point 130° C. to 132° C.; 838 grams minus 766 grams or 72 grams (9.3%) of $C_7Cl_2F_{12}$, boiling point 129° C. to 132° C.; 284 grams (35.7%) of $C_7Cl_3F_{11}$, boiling point 160° C. to 162° C.; 281 grams (33.8%) of $C_7Cl_4F_{10}$, boiling point 188° C. to 190° C.; and 57 grams (6.6%) of $C_7Cl_5F_9$, boiling point 217° C. to 219° C.

EXAMPLE 20.—FLUORINATION OF MONOCHLOROBIS(TRIFLUOROMETHYL)BENZENE WITH $AgF_2$

Monochlorobis(trifluoromethyl)benzene (1.45 moles) was vaporized through a reactor containing silver difluoride at 225° C., in approximately four and one-half (4½) hours. The product from the first cycle was recycled over silver difluoride at 335° C. to 375° C. in approximately three hours. Rectification of the washed and dried product at atmospheric pressure gave: 333.4 grams (57.5%) of $C_8F_{16}$, boiling point 99.5° C. to 101.5° C.; and 152.3 grams (25.2%) of $C_8ClF_{15}$, boiling point 128° C. to 129° C.

EXAMPLE 21.—FLUORINATION OF DICHLOROBIS(TRIFLUOROMETHYL)BENZENE WITH $AgF_2$

One and one-half moles (425 grams) of dichlorobis(trifluoromethyl)benzene was vaporized through a reactor containing silver difluoride at 225° C. in six hours. The washed and dried product from the first cycle was recycled over silver difluoride at 335° C. to 375° C. in approximately 3.5 hours. On rectification at atmospheric pressure there was obtained: 221 grams (36.8%) of $C_8F_{16}$, boiling point 99° C. to 101° C.; 260 grams (41.7%) of $C_8ClF_{15}$, boiling point 127° C. to 128° C.; and 60 grams (9.3%) of $C_8Cl_2F_{14}$, boiling point 153° C. to 154° C.

EXAMPLE 22.—FLUORINATION OF p-BIS(TRIFLUOROMETHYL)BENZENE WITH $CoF_3$ IN THE PRESENCE OF CHLORINE

Six moles of chlorine was vaporized through a reactor containing cobalt trifluoride simultaneously with approximately two moles (321 grams) of hexafluoroxylene, over a six-hour period. Three moles of chlorine was used during the second six-hour cycle over cobalt trifluoride. The reactors were maintained at approximately 275° C. and 375° C. during the first and second cycles, respectively. The following fractions were obtained when the washed and dried product was rectified at atmospheric pressure: 330 grams (54.8%) of $C_8F_{16}$, boiling point 89° to 101° C.; 170 grams (27.2%) of $C_8ClF_{15}$, boiling point 124° C. to 126° C.; and 40 grams (6.1%) of $C_8Cl_2F_{14}$, boiling point 152° C. to 154° C.

The examples and mode of operation given herein are illustrative only and other modifications of my invention can be made within the scope of the following claims.

I claim:
1. A new composition of matter comprising a dichlorododecafluoromethylcyclohexane having the formula $CF_3C_6Cl_2F_9$, and separated from the product obtained by reacting a ring-chlorinated benzotrifluoride with a metallic perfluoride until all the hydrogens of the chlorinated benzotrifluorides are replaced by fluorines and the benzene ring is converted to a saturated cyclohexane ring.

2. Mixed ring-chlorinated trifluoromethyl cyclohexane chlorofluorocarbons separated from the product obtained by reacting ring-chlorinated benzotrifluoride with a metallic perfluoride until all the hydrogens of the chlorinated benzotrifluorides are replaced by fluorines and the benzene ring is converted to a saturated cyclohexane ring.

3. A method of fluorinating a ring chlorinated benzotrifluoride with reduced substitution of fluorine for chlorine, which method comprises vaporizing said benzotrifluoride, mixing the vapors with chlorine gas, and contacting the mixture with a metallic perfluoride fluorinating agent under fluorinating conditions.

WALDO B. LIGETT.

References Cited in the file of this patent

UNITED STATES PATENTS

| Number | Name | Date |
|---|---|---|
| 2,480,080 | Ligett et al. | Aug. 23, 1949 |
| 2,499,833 | Perkins et al. | Mar. 7, 1950 |
| 2,533,132 | McBee et al. | Dec. 5, 1950 |
| 2,533,133 | McBee et al. | Dec. 5, 1950 |
| 2,614,129 | McBee et al. | Oct. 14, 1952 |

OTHER REFERENCES

Whearty: "Jour. Phys. Chem.," vol. 35, page 3144 (1931).

Grosse et al.: "Report on Chemical and Physical Properties of Fluorocarbons," September, 1942 (page 3).

McBee et al.: "Industrial and Engineering Chemistry," vol. 39, pages 310–313 (1947).